(12) United States Patent
Golles et al.

(10) Patent No.: US 11,117,505 B2
(45) Date of Patent: Sep. 14, 2021

(54) SEAT ASSEMBLY WITH ADJUSTABLE SIDE BOLSTERS

(71) Applicant: LEAR CORPORATION, Southfield, MI (US)

(72) Inventors: Dan Golles, Southfield, MI (US); Gerald Patrick, Shelby Township, MI (US); Kevin Geisler, Southfield, MI (US)

(73) Assignee: LEAR CORPORATION, Southfield, MI (US)

( * ) Notice: Subject to any disclaimer, the term of this patent is extended or adjusted under 35 U.S.C. 154(b) by 227 days.

(21) Appl. No.: 16/229,498

(22) Filed: Dec. 21, 2018

(65) Prior Publication Data

US 2020/0198511 A1 Jun. 25, 2020

(51) Int. Cl.
*B60N 2/68* (2006.01)
*B60N 2/02* (2006.01)
*B60N 2/90* (2018.01)

(52) U.S. Cl.
CPC .............. *B60N 2/99* (2018.02); *B60N 2/0244* (2013.01); *B60N 2/914* (2018.02); *B60N 2002/0272* (2013.01)

(58) Field of Classification Search
CPC ........ B60N 2/914; B60N 2/99; B60N 2/0244; B60N 2002/0274
See application file for complete search history.

(56) References Cited

U.S. PATENT DOCUMENTS

| 5,320,409 | A  | * | 6/1994 | Katoh  | B60N 2/0232 |
| | | | | | 297/284.6 |
| 5,707,109 | A  | * | 1/1998 | Massara | B60N 2/914 |
| | | | | | 297/284.9 |
| 6,037,731 | A  | * | 3/2000 | Fruehauf | B60N 2/0244 |
| | | | | | 318/468 |
| 6,056,079 | A  | * | 5/2000 | Cech | B60N 2/002 |
| | | | | | 177/144 |
| 6,203,105 | B1 | * | 3/2001 | Rhodes, Jr. | A47C 4/54 |
| | | | | | 297/284.6 |
| 6,629,715 | B2 | * | 10/2003 | Oh | B60N 2/0224 |
| | | | | | 296/63 |
| 7,068,178 | B2 | | 6/2006 | Oh | |

(Continued)

FOREIGN PATENT DOCUMENTS

WO 2017053503 A1 3/2017

*Primary Examiner* — Tan Q Nguyen
(74) *Attorney, Agent, or Firm* — Brooks Kushman P.C.

(57) ABSTRACT

A seat assembly is provided with a seat frame for a seat back or a seat bottom. At least two side bolster regions are spaced apart laterally on the seat frame. At least two bolster support assemblies are provided, each bolster support assembly comprising an air bladder mounted to the seat frame along each of the side bolster regions. An actuator inflates each air bladder between a deflated position and at least one inflated support position. An accelerometer is mounted to the seat frame. A controller is in electrical communication with the accelerometer and the actuator. The controller is programmed to receive data from the accelerometer indicative of a lateral acceleration. If the lateral acceleration is above a threshold, the controller commands the actuator to inflate one of the air bladders to the inflated support position.

19 Claims, 3 Drawing Sheets

(56) References Cited

U.S. PATENT DOCUMENTS

| | | | | |
|---|---|---|---|---|
| 8,474,862 B2* | 7/2013 | Pursche | ............... | B60R 21/268 |
| | | | | 280/730.2 |
| 8,702,120 B2* | 4/2014 | Kalisz | ................... | B60N 2/986 |
| | | | | 280/730.1 |
| 9,827,888 B2 | 11/2017 | Patrick et al. | | |
| 9,987,961 B2 | 6/2018 | Zouzal et al. | | |
| 10,232,814 B2* | 3/2019 | Gandhi | ................. | B60N 2/914 |
| 10,363,852 B2* | 7/2019 | Strumolo | ................. | B60N 2/99 |
| 10,464,456 B2* | 11/2019 | Boccuccia | ........... | B60N 2/4235 |
| 2003/0023363 A1* | 1/2003 | Katz | ..................... | B60N 2/914 |
| | | | | 701/49 |
| 2015/0008710 A1* | 1/2015 | Young | ................... | B60N 2/976 |
| | | | | 297/217.3 |
| 2015/0196131 A1* | 7/2015 | Dacosta-Mallet | ... | A47C 27/083 |
| | | | | 297/452.41 |
| 2018/0029503 A1 | 2/2018 | Dhaini | | |
| 2018/0056829 A1 | 3/2018 | Duncan | | |

* cited by examiner

SEAT ASSEMBLY WITH ADJUSTABLE SIDE BOLSTERS

TECHNICAL FIELD

The present disclosure relates to adjustable bolster cushions, and in particular to adjustable bolster cushions in a vehicle seat.

BACKGROUND

An adjustable seat assembly is illustrated and described in U.S. Pat. No. 9,827,888 which issued on Nov. 28, 2017 to Lear Corporation.

SUMMARY

According to at least one embodiment, a seat assembly is provided with a seat frame for a seat back or a seat bottom. At least two side bolster regions are spaced apart laterally on the seat frame. At least two bolster support assemblies are provided, each bolster support assembly comprising an air bladder mounted to the seat frame along each of the side bolster regions. An actuator inflates each air bladder between a deflated position and at least one inflated support position. An accelerometer is mounted to the seat frame. A controller is in electrical communication with the accelerometer and the actuator. The controller is programmed to receive data from the accelerometer indicative of a lateral acceleration. If the lateral acceleration is above a threshold, the controller commands the actuator to inflate one of the air bladders to the inflated support position.

In another embodiment, the controller receives data from the accelerometer indicating a duration of the lateral acceleration and commands the actuator to inflate the one air bladder if the duration exceeds a time threshold.

In another embodiment, the controller is programmed to compare the data from the accelerometer to reference data indicating vehicle speed, occupant data or location data. The threshold is based on the reference data and a lateral acceleration value.

In another embodiment, the controller is programmed to receive data based on occupant data and commands the actuator to inflate the one air bladder to the support position based on the occupant data and the lateral acceleration.

In another embodiment, the occupant data comprises at least one of occupant weight and occupant position.

In another embodiment, each bolster assembly comprises an upper air bladder and a lower air bladder.

In another embodiment, the two bolster support assemblies include a left-side bolster support assembly and a right-side bolster support assembly.

In another embodiment, the controller is programmed to command the actuator to inflate one of the left-side bolster support assembly and not the right-side bolster support assembly.

In another embodiment, the accelerometer is packaged in the controller, and the controller and accelerometer are mounted to the seat frame.

In another embodiment, the controller is programmed to receive data from the accelerometer indicating lateral acceleration decreased below the threshold for a deactivation time. The controller is programmed to command the actuator to deflate the air bladder if.

According to at least one other embodiment, a method for controlling a vehicle seat assembly is provided. The method includes receiving data from an accelerometer mounted on a vehicle seat assembly indicative of a lateral acceleration. If the lateral acceleration is above a threshold, an actuator is commanded to inflate one air bladder positioned along a side bolster to an inflated support position.

In another embodiment, the method includes receiving data from the accelerometer indicating a duration of the lateral acceleration. The actuator is commanded to inflate the one air bladder if the duration exceeds a time threshold.

In another embodiment, the method includes commanding the actuator to inflate the one air bladder positioned on a bolster opposite a direction of the lateral acceleration.

In another embodiment, the method includes receiving data based on occupant information. The actuator is commanded to inflate the air bladder based to one of the support positions based on occupant information and the lateral acceleration.

In another embodiment, the method includes receiving data from the accelerometer indicating the lateral acceleration decreased below threshold for a deactivation time. The actuator is commanded to deflate the one air bladder.

According to another embodiment, a seat assembly is provided having a seat bottom and a seat back extending upright from the seat bottom. At least two side bolster seating surfaces spaced apart laterally on at least one of the seat bottom and the seat back. Two bolster air bladder assemblies are provided, with one air bladder assembly provided adjacent each of the two side bolster seating surfaces. An actuator inflates each of the two bolster air bladder assemblies between a deflated position and at least one inflated support position. A plurality of sensors is in electrical communication to detect a seating position of an occupant and a lateral acceleration. A controller is in electrical communication with the plurality of sensors and the actuator. The controller is programmed to receive data from the plurality of sensors indicative of the lateral acceleration. If the lateral acceleration is above a threshold, the controller commands the actuator to inflate one of the two bolster air bladder assemblies opposite a direction of the lateral acceleration.

In another embodiment, at least one of the sensors is an accelerometer packaged in the controller.

In another embodiment, the two bolster air bladder assemblies include a left-side air bladder assembly and a right-side air bladder assembly. The controller commands the actuator to inflate one of the left-side and right-side air bladder assemblies and not the other based on the lateral acceleration.

In another embodiment, the two bolster air bladder assemblies inflate at an inward angle to provide lateral support.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A comfort, posture and wellness seating system for vehicle seat assemblies is provided. The system may be employed to properly configure any new or existing seating system. The system can also address specific comfort, posture or preferences. The seating system connects biomechanical optimization to measurable engineering data to make a complete comfort, posture and wellness seating system. The comfort, posture and wellness seating system integrates anthropometry, bio-mechanics, and historical seating comfort data. The seating system can be employed in original equipment for vehicles or in aftermarket products. Applicable markets include automotive, mass transit, airlines, or any seating where occupants experience acceleration.

Figure 1:
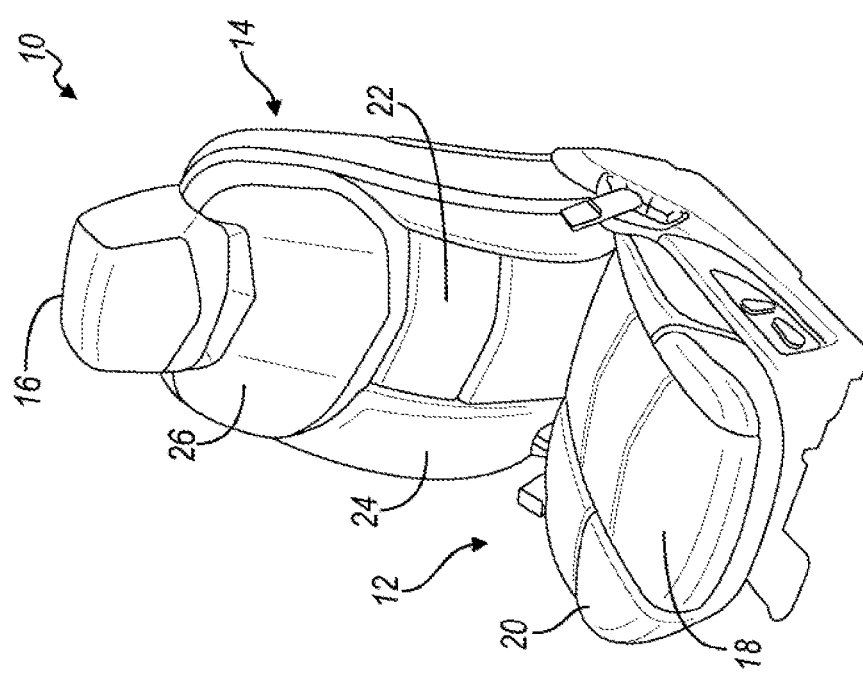
FIG. 1 is a front perspective view of a seat assembly according to an embodiment.

FIG. 1 illustrates a seat assembly 10 according to an embodiment. The seat assembly 10 may be utilized as a vehicle seat assembly 10 for seating in a vehicle, such as an automobile, an aircraft, a watercraft, or the like. Of course, the seat assembly 10 may be utilized in any seating environment that may benefit from an adjustable seat assembly 10.

The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for motor-driven pivotal adjustment relative to the seat bottom 12. A head restraint 16 may also be mounted for motor-driven adjustable translation to the seat back 14.

The seat bottom 12 includes a central seating surface 18 and a seating surface along a pair of side bolster regions 20 laterally spaced about the central seating surface 18. The seat back 14 includes a pelvic/lumbar seating surface 22 with a pair of laterally spaced apart side bolster regions 24 on either side. A thoracic/shoulder seating surface 26 is provided above the pelvic/lumbar seating surface 22 and the seating surface of seat back side bolster regions 24.

Figure 2:
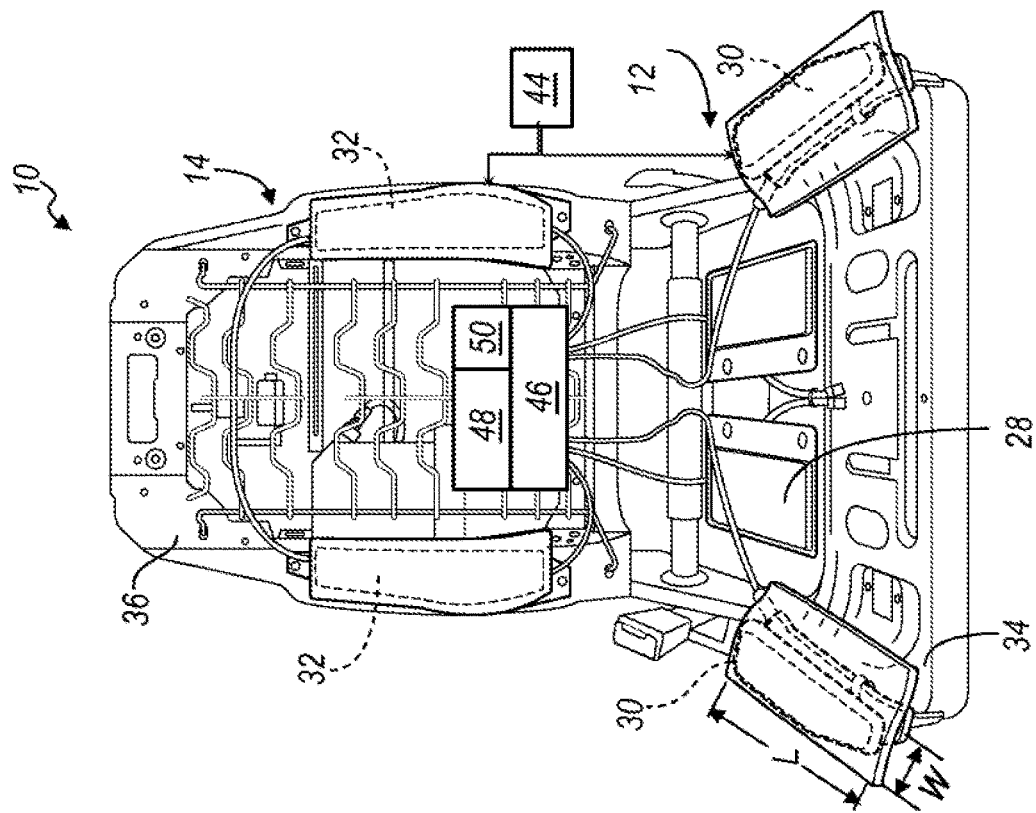
FIG. 2 is a front perspective view of the seat assembly of FIG. 1, according to an embodiment, illustrated partially disassembled.

FIG. 2 illustrates the seat assembly 10 with a cover and trim and foam removed for revealing underlying components. The seat bottom 12 includes a pair of pelvis air bladder assemblies 28 under the central seating surface 18. The seat bottom 12 also includes a pair of lower side bolster air bladder assemblies 30, each located in one of the seat bottom 12 adjacent the side bolster seating surface 20. Likewise, the seat back 14 includes a pair of upper side bolster air bladder assemblies 32, each located adjacent one of the seat back side bolster seating surfaces 24. Each of the side bolster air bladder assemblies 30, 32 is supported upon a frame 34, 36 of the corresponding seat bottom 12 and seat back 14.

The side bolster air bladder assemblies 30, 32 provide lateral support to a seated occupant when the vehicle experiences a turn or cornering. When the vehicle is turning or cornering, the occupant weight is shifted away from the center. The side bolster air bladder assemblies 30, 32 provides support in the seat back 14 and the seat bottom 12 to support the occupant's weight shift away from the center of the vehicle. The seat assembly 10 then inflates the side bolster air bladder assemblies 30, 32 in the seat bottom 12 and/or the seat back 14 to provide dynamic lateral support during the cornering or turning event.

The seat assembly 10 also includes an actuator or 44 for controlling inflation of the bladder assemblies 28, 30, 32. The actuator 44 may include a compressor or pneumatic pump connected to a valve bank to provide a source of air to the air bladder assemblies 28, 30, 32. A seat control module is provided in the seat bottom or seat back 14 and is identified generally as a controller 46. The controller 46 regulates compressed air into and out of the bladder assemblies 28, 30, 32 in the seat assembly 10. The controller 46 and actuator 44 may be installed in the seat back 14, as shown, or installed under the seat, or anywhere suitable in the vehicle.

The seat assembly 10 also includes an accelerometer 48 or sensor for detecting the acceleration of the seated occupant. In one embodiment, the accelerometer 48 is a three-axis accelerometer. The accelerometer 48 is in electrical communication with the controller 46 for conveying the detected information to the controller 46. In at least one embodiment, the accelerometer 48 is packaged in the controller 46. The controller 46 including the accelerometer 48 may be mounted on the seat frame 34, 36 along the seat back 14 or seat bottom 12. By mounting the accelerometer 48 on the seat assembly 10, the accelerometer 48 is able to better sense the amount of force and acceleration experienced by the occupant seated in the seat assembly. The accelerometer 48 also provides a more accurate way of sensing the amount of forces experienced in cornering or turning than other methods, such as steering wheel position or occupant position alone.

The seat assembly 10 may detect the occupant position. For example, the seat assembly may also include a plurality of sensors 50 to detect the occupant position. Each of the air bladder assemblies 28, 30, 32 may include at least one pressure sensor to detect air pressure in the respective air bladder assembly 28, 30, 32. Any pressure sensor 50 is contemplated, such as a pneumatic pressure sensor at the outlet valve of each respective air bladder assembly 28, 30, 32. Pressure can also be sensed by contact pressure sensors disposed in front of or behind some or all of the respective air bladder assemblies 28, 30, 32, including on a front or rear surface thereof. The contact pressure sensors may include pressure-sensing mats. The seat system 10 detect differences in air pressure (LH/RH) at the controller 46. The controller 46 may evaluates the data received from the sensors 50 to determine if the occupant is seated unevenly. According to one embodiment, this determination is performed by comparing left side pressures to right side pressures. According to another embodiment, the out of position detection is performed by comparing the pressure values to a predetermined position, such as a wellness position as selected by a health professional. Other suitable occupant position detection sensors or methods may be used in the seat assembly 10.

The seat assembly 10 may improves an occupant seating position by providing an active pneumatic support that provides lateral support to the occupant in a seated position to correct unbalanced seating conditions caused by turning or cornering of the vehicle. The side bolster air bladder assemblies 30, 32 may be specifically shaped to center an occupant. The side bolster air bladder assembles 30, 32 include an air bladder and a rigid support to provide inward angled support as the bladder inflates, as discuss in U.S. Ser. No. 15/254,602, the disclosure of which is hereby incorporated in its entirety by reference herein.

As shown in FIGS. 1-2, the side bolster seating surfaces 20, 24 are generally long and narrow to provide lateral support. The air bladder assemblies 30, 32 extends a length L that extends along the seat frame 34, 36 adjacent the side bolster seating surfaces 20, 24. On the seat bottom 12, the bladder length extends generally in the fore-aft direction. On the seat back 14, the bladder length extends generally in the upright direction. The air bladders have a bladder lateral width W that is less than the length L.

Figure 3:
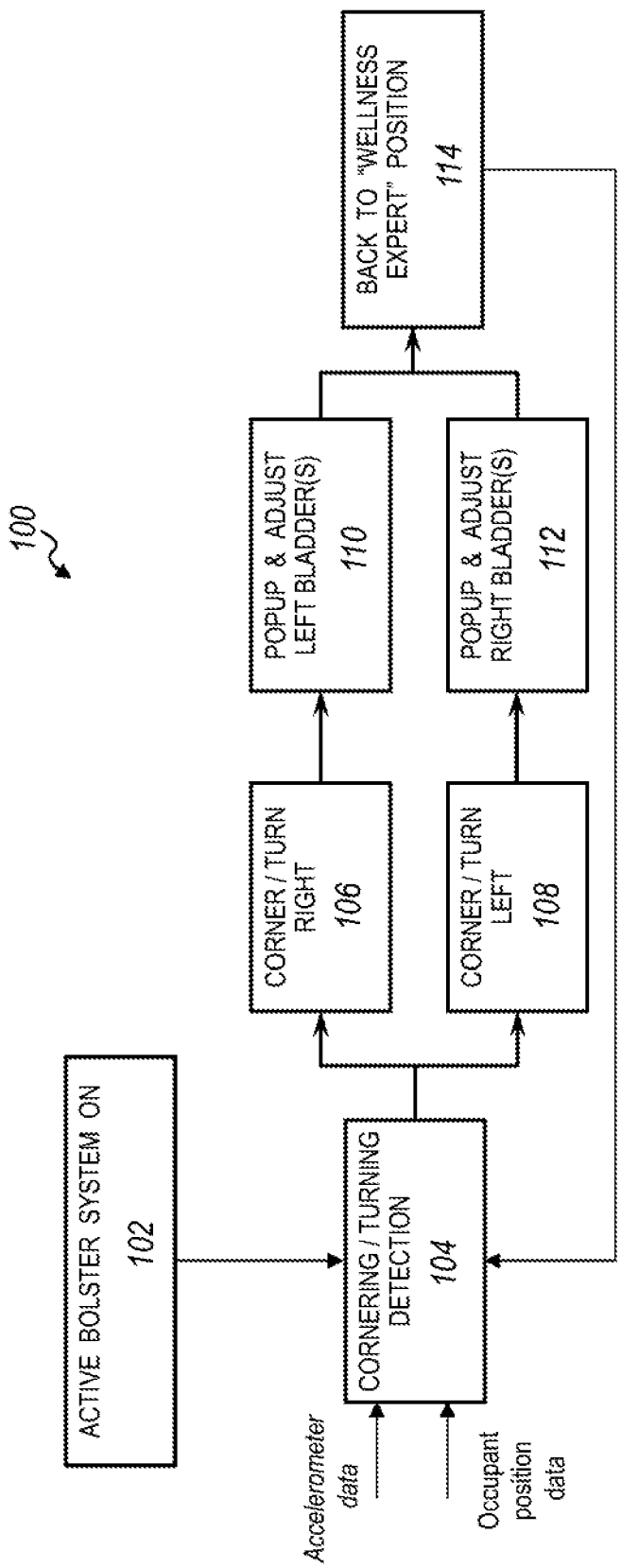
FIG. 3 is a flowchart illustrating a method of operating the seat assembly of FIG. 1.
Figure 4:
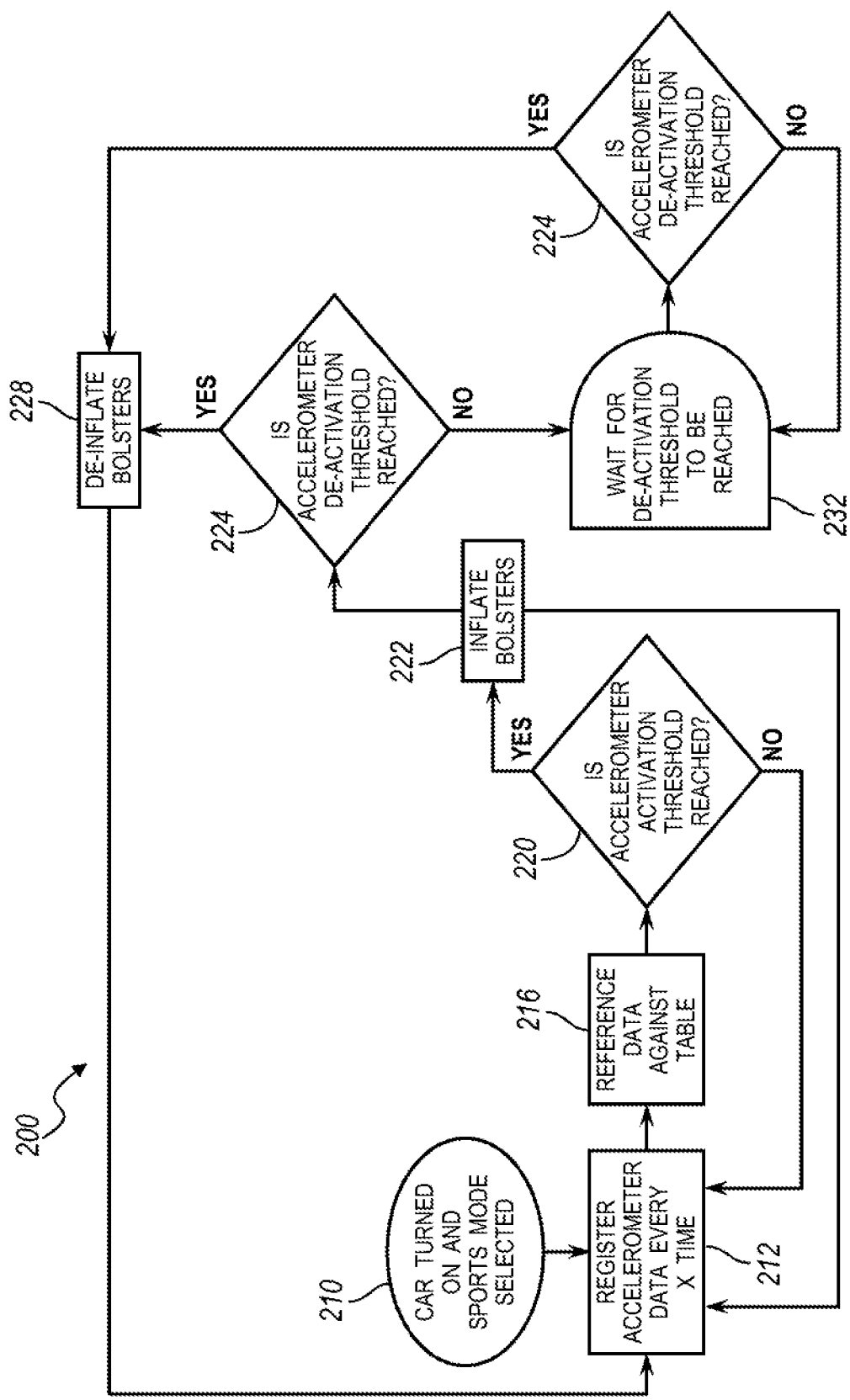
FIG. 4 is a flowchart illustrating a method of operating the seat assembly of FIG. 1.

FIGS. 3-4 illustrate a flowchart for a method for adjusting the vehicle seat assembly 10 using the accelerometer 48. The methods in FIGS. 3 and 4 are not exclusive the steps and features of the methods may be combined to form further embodiments. The controller may include a system of one or more computers that be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Other embodiments of this aspect include corresponding computer systems, apparatus, and computer programs recorded on one or more computer storage devices, each configured to perform the actions of the methods. Implementations of the described techniques may include hardware, a method or process, or computer software on a computer-accessible medium.

In FIG. 3, the method 100 for controlling the seat assembly is initiated when the active bolster system is turned ON, as indicated at block 102. The active bolster system may be turned ON manually by the vehicle occupant or may be automatically turned ON based on a signal indicating the seat is occupied.

In block 104, the method detects if the vehicle is corning or turning based on inputs from the accelerometer 48 or inputs detecting if the occupant is out of position. The controller 46 may receive occupant data indicating a change in occupant pressure distribution as well as the accelerometer data indicating a lateral acceleration.

The accelerometer 48 provides lateral acceleration data and sensors in the seat may provide position data of the occupant. If the accelerometer 48 and sensors indicate the occupant is out of position to the left or right and there is lateral acceleration, the bladders may be inflated and adjusted to provide lateral support. For example, if the controller 46 receives occupant data indicating the occupant is out of position to the left, and the accelerometer 48 indicates left lateral acceleration, the controller 46 indicates that the vehicle is turning or cornering to the right as shown in block 106. When the vehicle is turning or cornering to the right, the left bladder assembly may be inflated, as shown in block 110.

Conversely, if the accelerometer 48 indicates lateral acceleration to the right and the sensor indicate the occupant is out of position to the right, the controller 46 indicates that the vehicle is turning or cornering to the right as shown in blocks 108. When the vehicle is turning or cornering to the left, the right bladder assembly may be inflated, as shown in block 112.

At block 114, the bolster bladder assemblies inflate to various support settings to adjust the occupant back to a wellness/expert position. The wellness/expert position of occupants for optimal comfort, posture may be based on input data and settings provided by a doctor or chiropractor. For example, by inflating the left bladder assembly when the controller 46 receives accelerometer data indicating lateral acceleration to the left, the left bladders help shift the occupant to be centered in the seat. The bladders may not be inflated if the accelerometer 48 does not indicate lateral acceleration since the occupant may only be shifting in the seat or moving for a reason other than the vehicle is turning or travelling around a corner.

FIG. 4 depicts a flowchart for a method of controlling the seat assembly according to another embodiment. In FIG. 4, the method 200 for controlling the seat assembly may be initiated when the vehicle a sports mode is selected, as indicated at block 210. The sports mode may be a driving mode that indicate the desire for more aggressive driving style and may be manually selected by the driver. The dynamic control in method 200 may also be automatically initiated in response to a signal indicating the seat is occupied. The bolster air bladder assemblies 30, 32 may be inflated to a first inflation value to provide standard support and comfort.

At block 212, the accelerometer 48 registers and acquires acceleration data at predetermined time intervals. For example, the accelerometer 48 may provide acceleration data ever 100 milliseconds (ms). The acceleration data provides lateral acceleration data indicating the amount of lateral acceleration in a left direction or the right direction.

At block 216, the accelerometer data is compared against reference data table. The reference data table may include comparable lateral acceleration values as well as reference data relating to the size and weight of the occupants, vehicle speed data, road data, location data, or other reference data.

Based on the comparison of the accelerometer data to the reference data, the controller 46 determines if an accelerometer activation threshold has been reached, as indicated by decision block 220.

At block 222, if the lateral acceleration is above the threshold, the controller 46 commands the actuator 44 to inflate at least one of the bolster air bladder assemblies 30, 32. For example, if the lateral acceleration is to above a threshold value to the right-hand direction, the controller 46 commands the left bolster air bladder assembly to inflate without inflating the right bolster air bladder assembly. Based on the amount of lateral acceleration, the controller 46 may inflate the air bladder assemblies 30, 32 to increasing amounts of inflation to provide increased lateral support. The amount of inflation may also depend on the other reference data such as occupant size or vehicle speed, for example.

The activation threshold may also include a time duration threshold. For example, the controller 46 may command the actuator 44 to inflate one of the bolster air bladder assemblies only after the lateral acceleration is maintained for 300 ms. The time duration threshold may vary based on the response time of the accelerometer and/or the inflation response time of the bladders.

After one of the bolster air bladder assemblies is inflated, the controller 46 continues to monitor and acquire accelerometer data from accelerometer 48 and determines if a deactivation threshold has been reached, as shown at block 224.

At block 228, if the lateral acceleration is below the threshold, the controller 46 commands the actuator 44 to deflate the one bolster air bladder assembly and return to the even support or wellness position. The de-activation threshold may also include a time duration threshold. For example, the controller 46 may only command the actuator 44 to deflate the one bolster air bladder assembly only after the lateral acceleration is below the lateral acceleration threshold for a time duration, as shown at block 232.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
    a seat frame for at least one of a seat back and a seat bottom;
    at least two side bolster regions spaced apart laterally on the seat frame;
    at least two bolster support assemblies, each bolster support assembly comprising an air bladder mounted to the seat frame along each of the side bolster regions;
    an actuator for inflating each air bladder between a deflated position and at least one inflated support position;
    an accelerometer; and
    a controller in electrical communication with the accelerometer and the actuator, the controller programmed to:
        receive occupant data of an occupant seating position and at least one of an occupant weight or occupant size;
        receive data from the accelerometer indicative of a lateral acceleration;
        compare the occupant seating position to a predetermined wellness position based on the occupant weight and size,
        if the lateral acceleration is above a threshold and the occupant seating position differs from the wellness position, command the actuator to inflate one of the air bladders to the inflated support position.

2. The seat assembly of claim 1 wherein the controller is further programmed to:
    receive data from the accelerometer indicating a duration of the lateral acceleration; and
    command the actuator to inflate the one air bladder if the duration exceeds a time threshold.

3. The seat assembly of claim 1 wherein the controller is further programmed to:
    compare the data from the accelerometer to reference data comprising at least one of a vehicle speed, occupant data or location data,
    wherein the threshold is based on the reference data and a lateral acceleration value.

4. The seat assembly of claim 1 wherein the accelerometer is packaged in the controller and the controller is mounted to the seat frame.

5. The seat assembly of claim 4 further comprising at least one sensor in electrical communication to detect the occupant seating position.

6. The seat assembly of claim 1 wherein each bolster assembly comprises an upper air bladder and a lower air bladder.

7. The seat assembly of claim 1 wherein the two bolster support assemblies comprise:
    a left-side bolster support assembly; and
    a right-side bolster support assembly.

8. The seat assembly of claim 7 wherein the controller is further programmed to:
    command the actuator to inflate one of the left-side bolster support assembly and not the right-side bolster support assembly.

9. The seat assembly of claim 1 wherein the accelerometer is packaged in the controller, and
    wherein the controller and accelerometer are mounted to the seat frame.

10. The seat assembly of claim 1 wherein the controller is further programmed to:
    receive data from the accelerometer indicating lateral acceleration decreased below the threshold for a deactivation time;
    command the actuator to deflate the one air bladder if the lateral acceleration decreased below the threshold for the deactivation time.

11. A method comprising:
    receiving occupant data based on at least one of an occupant weight or occupant size;
    receiving data based on an occupant position;
    comparing the occupant position to a predetermined wellness position based on at least one of the occupant weight or occupant size, and
    receiving data from an accelerometer mounted on a vehicle seat assembly indicative of a lateral acceleration; and
    if the lateral acceleration is above a threshold and the occupant position differs from the predetermined wellness position, commanding an actuator to inflate one air bladder positioned along a side bolster to an inflated support position, wherein the inflated support position is based on the occupant data and the lateral acceleration.

12. The method of claim 11, further comprising:
    receiving data from the accelerometer indicating a duration of the lateral acceleration; and
    commanding the actuator to inflate the one air bladder if the duration exceeds a time threshold.

13. The method of claim 11, further comprising:
    commanding the actuator to inflate the one air bladder positioned on a bolster opposite a direction of the lateral acceleration.

14. The method of claim 11 further comprising:
    receiving data from the accelerometer indicating the lateral acceleration decreased below threshold for a deactivation time; and
    commanding the actuator to deflate the one air bladder.

15. A seat assembly comprising:
    a seat bottom;
    a seat back extending upright from the seat bottom;
    at least two side bolster seating surfaces spaced apart laterally on at least one of the seat bottom and the seat back;
    two bolster air bladder assemblies, one air bladder assembly provided adjacent each of the two side bolster seating surfaces;
    an actuator for inflating each of the two bolster air bladder assemblies between a deflated position and at least one inflated support position; and
    a plurality of sensors in electrical communication to detect a seating position of an occupant and a lateral acceleration,
    a controller in electrical communication with the plurality of sensors and the actuator, the controller programmed to:
        receive data from the plurality of sensors indicative of the lateral acceleration;

receive occupant data of at least one of an occupant weight or occupant size;

compare the seating position of the occupant to a predetermined wellness position based on the occupant data, and if the lateral acceleration is above a threshold and the occupant seating position differs from the wellness position, command the actuator to inflate one of the two bolster air bladder assemblies opposite a direction of the lateral acceleration.

16. The seat assembly of claim 15 wherein at least one of the sensors is an accelerometer packaged in the controller, wherein the accelerometer and controller are mounted to at least one of the seat bottom or seat back.

17. The seat assembly of claim 15 wherein each bolster air bladder assembly comprises an upper bladder and a lower air bladder.

18. The seat assembly of claim 15 wherein the two bolster air bladder assemblies comprise:

a left-side air bladder assembly; and a right-side air bladder assembly, wherein the controller is further programmed to:

command the actuator to inflate one of the left-side and right-side air bladder assemblies and not the other based on the lateral acceleration.

19. The seat assembly of claim 15 wherein the two bolster air bladder assemblies inflate at an inward angle to provide lateral support.

* * * * *